March 31, 1953 W. R. BECK 2,633,309
CABLE GUIDE
Filed Dec. 8, 1949 3 Sheets-Sheet 1
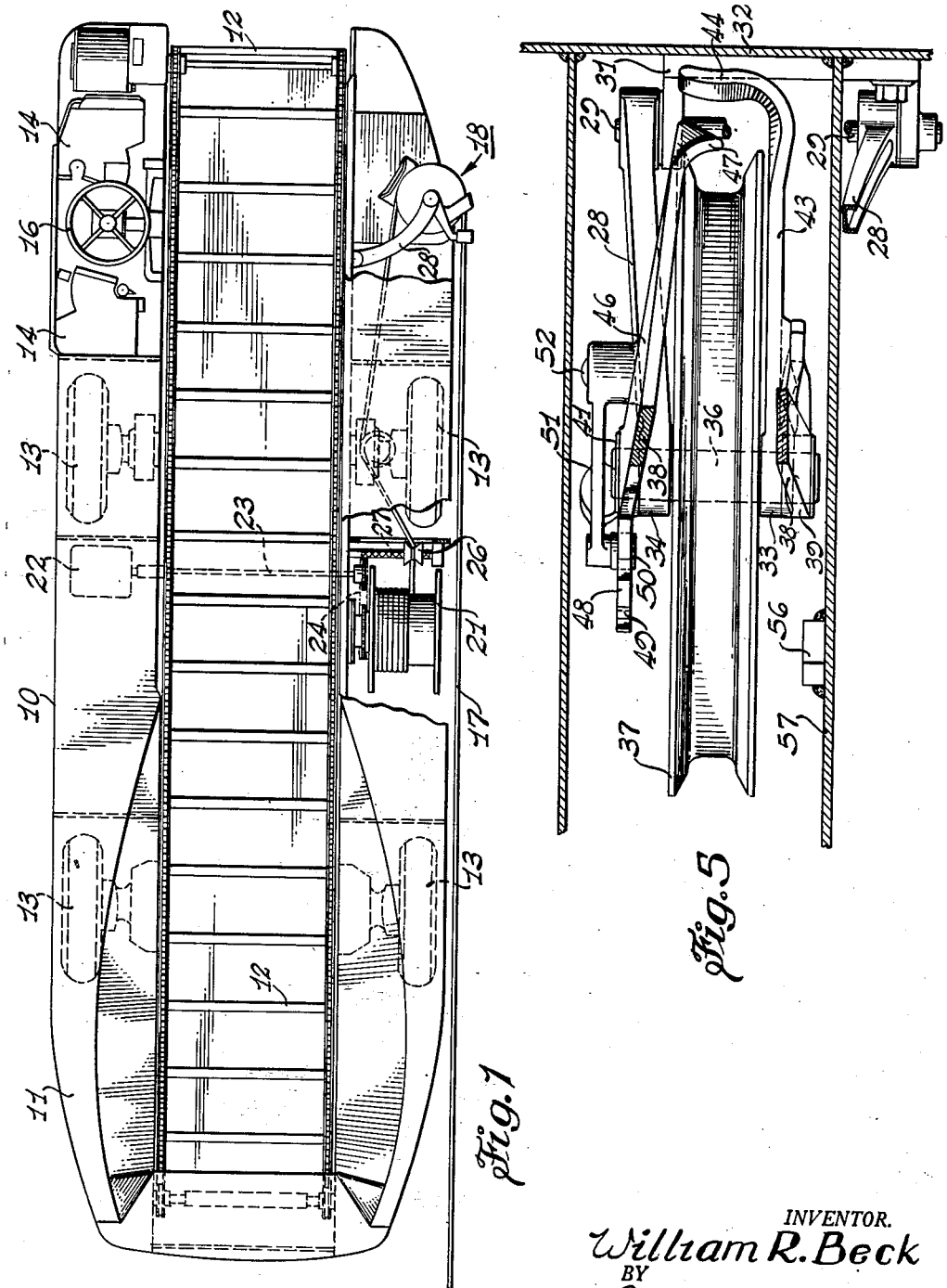
INVENTOR.
William R. Beck
BY
Clarence F. Poole
ATTORNEY

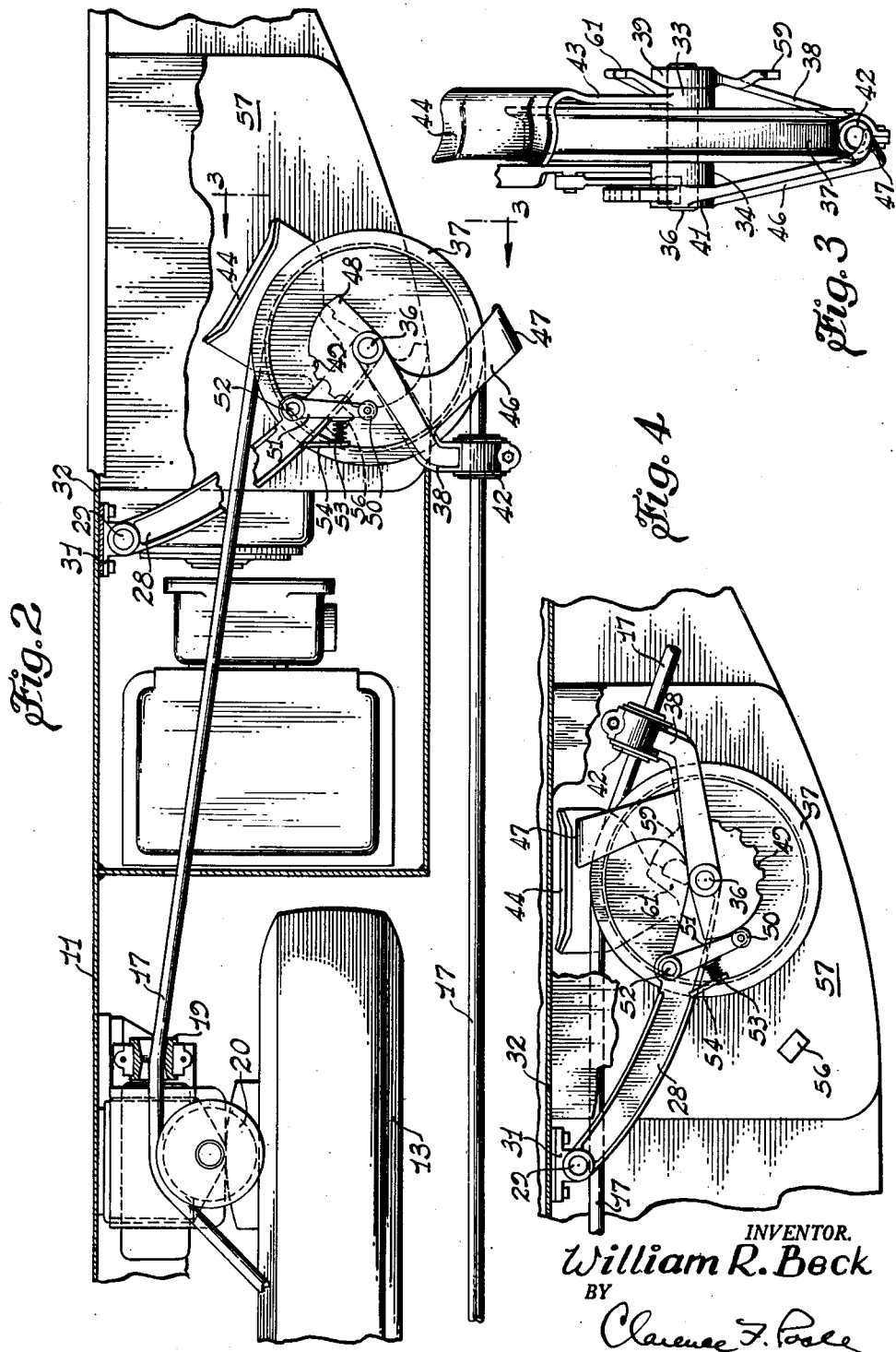

March 31, 1953 W. R. BECK 2,633,309
CABLE GUIDE

Filed Dec. 8, 1949 3 Sheets-Sheet 3

INVENTOR.
William R. Beck
BY
Clarence F. Poole
ATTORNEY

Patented Mar. 31, 1953

2,633,309

UNITED STATES PATENT OFFICE 2,633,309

CABLE GUIDE

William R. Beck, Chicago, Ill., assignor to Goodman Manufacturing Company, Chicago, Ill., a corporation of Illinois Application December 8, 1949, Serial No. 131,843

10 Claims. (Cl. 242—92)

This invention relates to improvements in guides for the power supply cable of a mine shuttle car.

In those mines operated by trackless systems, shuttle cars are employed for hauling material from the working face to the entry or other point of discharge onto a conveyor system, be it a belt or shaker type of conveyor. Ordinarily, such shuttle cars are propelled by electric motors connected by a supply cable to a junction which may be located at a point intermediate the working face and the point of discharge of the shuttle car. The supply cable for the car is wound upon a cable reel mounted on the car, and as the shuttle car moves past the junction point the supply cable is alternately wound upon or payed from the cable reel.

Likewise, when the shuttle car passes the junction point the supply cable changes its direction of lay with respect to the junction point. At the same time, also, the cable must be guided according to the relationship of the vehicle with respect to the junction. Thus the cable must be so guided that it will be payed off or wound upon the cable reel from the end of the vehicle with reference to one side of the junction point, or so guided that it will be payed off or wound upon the cable reel from the side of the vehicle with reference to the other side of the junction point, in order that the vehicle will not overrun its supply cable.

The principal object of the present invention is to afford a guide for the supply cable of a shuttle car which will prevent fouling of the supply cable irrespective of the position and direction of the shuttle car and irrespective of the change in direction of the shuttle car.

Another object comprehends the provision of a guide sheave mounted on a swingable arm and having a cable guide arm adapted to swing with respect to the swingable arm according to the direction of lay of the cable, the guide arm being prevented from having unintended swinging movement with respect to the swinging arm by a detent yieldably locking the swingable arm and the cable guide arm in proper position with respect to each other, the arrangement being such that the cable will not become disengaged from the guide sheave.

Still another object is to afford an arrangement of guides for the supply cable of a mine car which will prevent the supply cable from becoming disengaged from the guide sheave, and to maintain such engagement of the supply cable with the sheave irrespective of the direction of motion of the shuttle car or the change in direction of such motion.

Other objects and important features of the invention will be apparent from a study of the following description taken together with the drawings which illustrate a preferred form of the invention and what is now considered to be the best mode of applying the principles thereof. While the invention is described in terms of what is now considered to be a preferred embodiment thereof, its scope is intended to be limited only by the appended claims.

In the drawings:

Figure 1 is a plan view of a mine shuttle car embodying the cable guide according to the present invention;

Figure 2 is an enlarged plan view of the cable guide shown in Figure 1;

Figure 3 is an enlarged end view of the cable guide of Figures 1 and 2, looking in the direction of the arrows 3—3 of Figure 2;

Figure 4 is a view similar to Figure 2 but showing the cable guide according to the present invention in position to pay off or wind up the supply cable over the end of the shuttle car;

Figure 5 is an enlarged end view of the cable guide in the position as shown in Figure 4.

Figure 6:
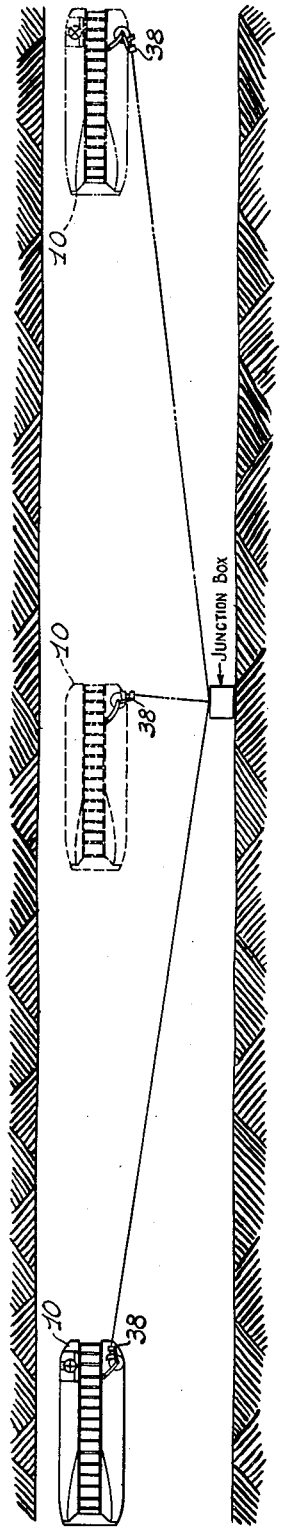
Figure 6 is a schematic diagram showing the shifting of the cable guide according to the position of the shuttle car with respect to the junction point.

Referring now particularly to Figures 1 and 2 of the drawings, there is shown a mine shuttle car 10 which includes a storage bed and frame 11 having a flight conveyor 12 moving longitudinally thereof for storage of material thereon for transport in a mine and for discharge of material therefrom onto a conveyor or other transporting medium. The shuttle car 10 is provided with front and rear dirigible driving wheels 13 which are under the control of an operator occupying a seat 14, the vehicle being steered by the operator occupying either of the seats 14, by means of a steering wheel 16.

Power is supplied to the vehicle 10 by means of a flexible power cable 17 which is gudied with respect to the vehicle by a cable guide 18. The power cable 17 is threaded through a guide eye 19 and over an idler sheave 20, both of which are supported in any convenient fashion by the frame 11. The cable 17 is wound upon or payed from a cable reel 21 as the car 10 moves with respect to a fixed junction supplying power to the drive motors thereof, not shown. The cable reel 21 is powered by a fluid or electric drive motor 22 connected by a shaft 23, which in turn is connected to a drive chain 24 to drive the cable reel 21. The cable 17 is layer wound upon the reel by means of a spooler 26 mounted upon a reversing lead screw 27.

The details of the construction of the shuttle car thus far described form no part of the present invention except as may be necessary to support the description and the details of construction of the cable guide 18.

The cable guide 18 includes a double swinging arm 28 which is journaled on a vertical shaft 29 supported in a bracket 31 bolted to a vertical side member 32 of the shuttle car 10. As seen in Figure 5, the lower swinging arm 28 is curved upwardly and terminates in a hub 33, and the upper arm 28 in a similar fashion terminates in a hub 34, the hubs 33 and 34 being drilled to receive and support a vertical shaft 36 for a guide sheave 37 adapted to turn freely at the free end of the swinging arm 28. The vertical shaft 36 likewise provides a turning center for cable guide arms 38 having hubs 39 and 41, which respectively underlie and overlie the hubs 33 and 34. The cable guide arms 38 are formed with an eye 42 at the free end thereof to provide a guide for the cable 17 which is threaded therethrough.

In order that the cable 17 will be maintained in contact with the guide sheave 37 for all positions of the cable guide arm 38 with respect to the swinging arm 28, the hub 33 of the swinging arm 28 is formed integrally with a cable support 43 having an upwardly extending flange 44 which is spaced a slight amount from the periphery of the guide sheave 37, and which extends for a distance along the periphery of the guide sheave 37. It will be noted from Figure 5 that the cable 17 will be thus supported by the cable support 43 should the cable 17 tend to fall out of engagement with the groove of the sheave 37. The hub 41 of the cable guide arm 38 is likewise integrally formed with a cable hold down arm 46 having a downward extension 47 which partly overlies the groove of the sheave 37 and which prevents any tendency of the cable 17 in arching up from leaving the groove of the sheave 37.

Referring now to Figure 4 of the drawings, when the shutter car 10 is paying out or reeling in cable over the right end thereof, as seen in Figure 6, the car occupying the position to the left of the junction box, the swinging arm 28 and the cable guide arm 38 will occupy the position as shown in Figure 4. If the shuttle car is moving to the left, as seen in Figure 4, and is on the left side of the junction point as seen in Figure 6, the parts will continue to occupy the position shown, and likewise if the direction of the car should be reversed, that is, the car 10 should be moving to the right as seen in Figure 4, the parts will occupy the same position shown until the car approaches the power junction therefor.

As shown in Figures 1 and 2, the cable 17 occupies the position shown when the car is traveling away from the power junction and to the right thereof, that is, considering the end of the vehicle shown in Figure 1 as being the front of the vehicle, the position of the cable 17 would be that when the vehicle is moving away from the power junction and on the right side thereof. Should the direction of the vehicle be reversed there would normally be a tendency of the cable guide arm 38 to move in a counterclockwise direction with respect to the swinging arms 28, since a torque would be created caused by the weight of the unsupported portion of the cable 17 upon the cable guide eye 42. The torque so created would normally tend to cause the cable guide arm 38 to move in a counterclockwise direction with respect to the arms 28, and the tendency for such counterclockwise movement would tend to move the cable 17 out of disengagement with the guide sheave 37, particularly when the cable reel 21 had not reversed its direction of movement as rapidly as the car 10 had reversed its direction of movement. In order to prevent the tendency of the cable guide arm to have such counterclockwise movement upon the conditions just stated, means are provided for releasably locking the arm 38 with respect to the arms 28 in the position shown in Figures 1 and 2. To this end the hub 41 of the upper arm 38 is provided with a detent plate 48 having a plurality of spaced notches 49 therein. The notches 49 cooperate with a detent arm 51 having a detent roller 50 on the end thereof and pivoted to the upper swinging arm 28 as at 52. The detent arm 51 is biased in a counterclockwise direction as seen in Figure 2 by a spring 53 bearing thereagainst and bottomed at its other end against a stop 54 struck out from the upper arm 28.

Normally, the operation of the vehicle on the other side of the junction point, as seen in Figure 2, causes the arms 28 to be moved to the position shown with the lower arm 28 engaging a stop 56 formed on a plate 57 extending from the vertical plate member 32. The tension induced in the cable 17 by movement of the car 10 to the right causes the cable guide arm 38 to move in a clockwise direction with respect to the guide arms 28 until the detent arm 51 is in the detent notch shown. This position of the cable guide 38 with respect to the swinging arms 28 will be maintained for all directions of travel of the shuttle car 10 as long as it remains on the other side of the junction point as seen in Figure 6. As the shuttle car moves to the left as seen in Figure 6, the arm 38 will change its position with respect to the swinging arms 28, and the detent arm 51 will occupy successive notches 49, as will be occasioned by proper guiding of the cable 17 with respect to the shuttle car 10 as the shuttle car 10 moves closer to the junction point. As seen in Figure 6 when the shuttle car 10 is directly opposite the junction point, the arm 38 will have swung in a counterclockwise direction until the cable 17 is guided at right angles to the shuttle car. As the car moves to the left as seen in Figure 6, past the junction point, the cable guide arm 38 will continue to move in a counterclockwise direction until the swinging arm 28 and the cable guide arm 38 occupy the position as seen in Figure 4.

In order to limit the amount of counterclockwise movement of the guide arm 38 with respect to the swinging arms 28, the hub 39 of the lower guide arms 38 is provided with an arm 59 struck out therefrom, which engages an arm 61 formed on the hub 33, until the arms 59 and 61 are in contact as seen in dotted lines in Figure 4.

It will be observed that the cable support 44 and the cable hold down member are at all times preventing the possibility of disengagement of the cable 17 from the guide sheave 37. For example, should the direction of the car be suddenly reversed, as seen in Figure 2, that is, the direction of movement changed suddenly to the left, any tendency of the cable to loop up will be prevented by the cable hold down member 46, and any tendency of the cable 17 to drop below the sheave 37 will be prevented by the cable support 43.

From the foregoing description of the invention it will be apparent that it is possible to guide the supply cable for a shuttle car at all times, irrespective of the direction of motion of the car, and also irrespective of its position with respect to a fixed supply junction point. It will also be apparent from the foregoing description that according to the present invention a novel and useful means has been provided for preventing the fouling of the power supply cable for all directions of movement of the shuttle car and for all positions of movement of the shuttle car with respect to the supply junction.

While the invention has been described in terms of what is now considered to be a preferred embodiment thereof, its scope is intended to be limited only by the appended claims.

I claim as my invention:

1. In a cable guide for a mine vehicle having a reeled supply cable connected to a source of power at a fixed point, a swinging arm mounted on said vehicle and having a cable guide sheave mounted at the free end thereof, a cable guiding arm mounted on said swinging arm for pivotal movement with respect to said swinging arm and occupying a first position with respect to said swinging arm when said vehicle has moved to positions on one side of said fixed point and occupying a second position with respect to said swinging arm when said vehicle has moved to positions on the other side of said fixed point, and means for locking said cable guiding arm in said first position to prevent pivotal movement of said cable guiding arm with respect to said swingable arm upon reversal of said vehicle at positions on said one side of said fixed point.

2. In a cable guide for a mine vehicle having a reeled supply cable connected to a source of power at a fixed point, a swinging arm mounted on said vehicle and having a cable guide sheave mounted at the free end thereof, a cable guiding arm mounted on said swinging arm for pivotal movement with respect to said swinging arm and occupying a first position with respect to said swinging arm when said vehicle has moved to positions on one side of said fixed point and occupying a second position with respect to said swinging arm when said vehicle has moved to positions on the other side of said fixed point, and means for locking said cable guiding arm in said first position to prevent pivotal movement of said cable guiding arm with respect to said swingable arm upon reversal of said vehicle at positions on said one side of said fixed point comprising a notched detent plate movable with said cable guide arm and a spring biased detent arm pivotally connected to said swinging arm.

3. In a cable guide for a mine vehicle having a reeled supply cable connected to a source of power at a fixed point, a swinging arm mounted on said vehicle and having a cable guide sheave mounted at the free end thereof, a cable guiding arm mounted on said swinging arm for pivotal movement with respect to said swinging arm and occupying a first position with respect to said swinging arm when said vehicle has moved to positions on one side of said fixed point and occupying a second position with respect to said swinging arm when said vehicle has moved to positions on the other side of said fixed point, and means for locking said cable guiding arm in said first position to prevent pivotal movement of said cable guiding arm with respect to said swingable arm upon reversal of said vehicle at positions on said one side of said fixed point comprising a notched detent plate secured to one of said arms, and a spring biased detent arm pivotally connected to the other of said arms.

4. In a cable guide for a mine vehicle having a reeled supply cable connected to a source of power at a fixed point, a swinging arm mounted on said vehicle and having a cable guide sheave mounted at the free end thereof, a cable guiding arm mounted on said swinging arm for pivotal movement with respect to said swinging arm and occupying a first position with respect to said swinging arm when said vehicle has moved to positions on one side of said fixed point and occupying a second position with respect to said swinging arm when said vehicle has moved to positions on the other side of said fixed point, and means for holding said cable in substantial alignment with said sheave during all positions of said swinging arm and said cable guide arm comprising a cable support movable with said swinging arm and a cable hold down member movable with said cable guide arm.

5. In a cable guide for a mine vehicle having a reeled supply cable connected to a source of power at a fixed point, a swinging arm mounted on said vehicle and having a cable guide sheave mounted at the free end thereof, a cable guiding arm mounted on said swinging arm for pivotal movement with respect to said swinging arm and occupying a first position with respect to said swinging arm when said vehicle has moved to positions on one side of said fixed point and occupying a second position with respect to said swinging arm when said vehicle has moved to positions on the other side of said fixed point, and means for holding said cable in substantial alignment with said sheave for all positions of said swinging arm and said cable guide arm comprising a cable support movable with and supported by one of said arms and a cable hold down member movable with and supported by the other of said arms.

6. In a cable guide for a mine vehicle having a reeled supply cable connected to a source of power at a fixed point, a swinging arm mounted on said vehicle and having a cable guide sheave mounted at the free end thereof, a cable guiding arm mounted on said swinging arm for pivotal movement with respect to said swinging arm and occupying a first position with respect to said swinging arm when said vehicle has moved to positions on one side of said fixed point and occupying a second position with respect to said swinging arm when said vehicle has moved to positions on the other side of said fixed point, and means for holding said cable in substantial alignment with said sheave for all positions of said swinging arm and said cable guiding arm comprising a cable support movable with and supported by one of said arms and a cable hold down member movable with and supported by the other of said arms, and means for locking said cable guiding arm in said first position to prevent pivotal movement of said cable guiding arm with respect to said swingable arm upon reversal of said vehicle at positions on said one side of said fixed point.

7. In a cable guide for a mine vehicle having a reeled supply cable connected to a source of power at a fixed point, a swinging arm mounted on said vehicle and having a cable guide sheave mounted at the free end thereof, a cable guiding arm mounted on said swinging arm for pivotal movement with respect to said swinging arm and occupying a first position with respect to said swinging arm when said vehicle has moved to positions on one side of said fixed point and occupying a second position with respect to said swinging arm when said vehicle has moved to positions on the other side of said fixed point, and means for controlling the swing of said cable guide arm with respect to said swinging arm as said vehicle moves past said fixed point to prevent unwrapping of said cable around said sheave comprising a detent plate movable with said cable guide arm and having a plurality of spaced notches therein, a detent arm pivotally connected to said swinging arm, and spring means urging said detent arm against said detent plate and into said notches.

8. In a cable guide for a mine vehicle having a reeled supply cable connected to a source of power at a fixed point, a swinging arm mounted on said vehicle and having a cable guide sheave mounted at the free end thereof, a cable guiding arm mounted on said swinging arm for pivotal movement with respect to said swinging arm and occupying a first position with respect to said swinging arm when said vehicle has moved to positions on one side of said fixed point and occupying a second position with respect to said swinging arm when said vehicle has moved to positions on the other side of said fixed point, and means for controlling the swing of said cable guide arm with respect to said swinging arm as said vehicle moves past said fixed point to prevent unwrapping of said cable around said sheave comprising a notched detent plate movable with one of said arms, and a spring biased detent arm connected to the other of said arms and bearing against said detent plate.

9. In a cable guide for a mine vehicle having a reeled supply cable connected to a source of power at a fixed point, a swinging arm mounted on said vehicle and having a cable guide sheave mounted at the free end thereof, a cable guiding arm mounted on said swinging arm for pivotal movement with respect to said swinging arm and occupying a first position with respect to said swinging arm when said vehicle has moved to positions on one side of said fixed point and occupying a second position with respect to said swinging arm when said vehicle has moved to positions on the other side of said fixed point, and means for controlling the swing of said cable guide arm with respect to said swinging arm as said vehicle moves past said fixed point to prevent unwrapping of said cable around said sheave comprising a releasable latch mechanism holding said cable guide arm in proper position with respect to said swinging arm.

10. In a cable guide for a mine vehicle having a reeled supply cable connected to a source of power at a fixed point, a swinging arm mounted on said vehicle and having a cable guide sheave mounted at the free end thereof, a cable guiding arm mounted on said swinging arm for pivotal movement with respect to said swinging arm and occupying a first position with respect to said swinging arm when said vehicle has moved to positions on one side of said fixed point and occupying a second position with respect to said swinging arm when said vehicle has moved to positions on the other side of said fixed point, and means for controlling the swing of said cable guide arm with respect to said swinging arm as said swinging arm and said cable guide arm change position with respect to said vehicle when said vehicle moves past said fixed point, to prevent unwrapping of said cable around said sheave comprising a releasable latch mechanism for locking said cable guide arm in position with respect to said swinging arm according to the position of said vehicle with respect to said fixed point in moving with reference thereto.

WILLIAM R. BECK.

REFERENCES CITED

The following references are of record in the file of this patent:

UNITED STATES PATENTS

| Number | Name | Date |
|---|---|---|
| 2,562,886 | Beck | Aug. 7, 1951 |